(12) United States Patent
Fischer et al.

(10) Patent No.: US 12,337,521 B2
(45) Date of Patent: Jun. 24, 2025

(54) METHOD AND APPARATUS FOR HEATING PLASTIC PREFORMS WITH ABSORPTION MEASUREMENT

(71) Applicant: KRONES AG, Neutraubling (DE)

(72) Inventors: Simon Fischer, Regensburg (DE); Ulrich Lappe, Neutraubling (DE); Stefan Schober, Tegernheim (DE)

(73) Assignee: KRONES AG, Neutraubling (DE)

( * ) Notice: Subject to any disclaimer, the term of this patent is extended or adjusted under 35 U.S.C. 154(b) by 110 days.

(21) Appl. No.: 18/074,328

(22) Filed: Dec. 2, 2022

(65) Prior Publication Data
US 2023/0191688 A1    Jun. 22, 2023

(30) Foreign Application Priority Data

Dec. 22, 2021 (DE) .................. 10 2021 134 262.7

(51) Int. Cl.
| | | |
|---|---|---|
| B29C 49/64 | (2006.01) | |
| B29C 49/68 | (2006.01) | |
| G01N 21/59 | (2006.01) | |
| H05B 3/00 | (2006.01) | |
| G01N 21/84 | (2006.01) | |

(52) U.S. Cl.
CPC .......... *B29C 49/6418* (2013.01); *B29C 49/68* (2013.01); *G01N 21/59* (2013.01); *H05B 3/0057* (2013.01); *G01N 2021/8411* (2013.01); *H05B 2203/032* (2013.01)

(58) Field of Classification Search
CPC ... B29C 49/6418; B29C 49/68; H05B 3/0057; H05B 2203/032; G01N 2021/8411
See application file for complete search history.

(56) References Cited

U.S. PATENT DOCUMENTS

| | | | |
|---|---|---|---|
| 2006/0118983 A1* | 6/2006 | Cochran .................. | A23L 5/36 264/492 |
| 2009/0261513 A1 | 10/2009 | Forsthovel et al. .......... | 264/410 |
| 2020/0298463 A1* | 9/2020 | Stopfer .................. | B29C 49/80 |

FOREIGN PATENT DOCUMENTS

| | | | | |
|---|---|---|---|---|
| CA | 2847557 A1 | * | 3/2013 | ............ B29C 49/78 |
| CA | 2920885 C | * | 5/2018 | ............ B29C 49/12 |
| EP | 2011617 | | 1/2009 | ............ B29C 11/14 |
| EP | 2110224 | | 10/2009 | ............ B29C 49/64 |
| EP | 2236268 | | 10/2010 | ............ B29C 49/42 |
| WO | WO2013000988 | | 1/2013 | ............ G01B 11/06 |

OTHER PUBLICATIONS

European Search Report issued in related European Patent Application Serial No. 22212517.1, dated Apr. 12, 2023, with translation, 11 pages.

* cited by examiner

*Primary Examiner* — Robert B Davis
(74) *Attorney, Agent, or Firm* — HAYES SOLOWAY P.C.

(57) ABSTRACT

Disclosed is a method for heating plastic preforms, wherein the plastic preforms are transported along a predetermined transport path and are heated during this transport by applying electromagnetic radiation, wherein an absorption and/or transmission of the plastic preforms is determined for radiation in an infrared wavelength range, wherein an absorption and/or transmission of the plastic preforms and/or of the plastic containers produced from these plastic preforms is determined for radiation in a visible wavelength range.

15 Claims, 1 Drawing Sheet

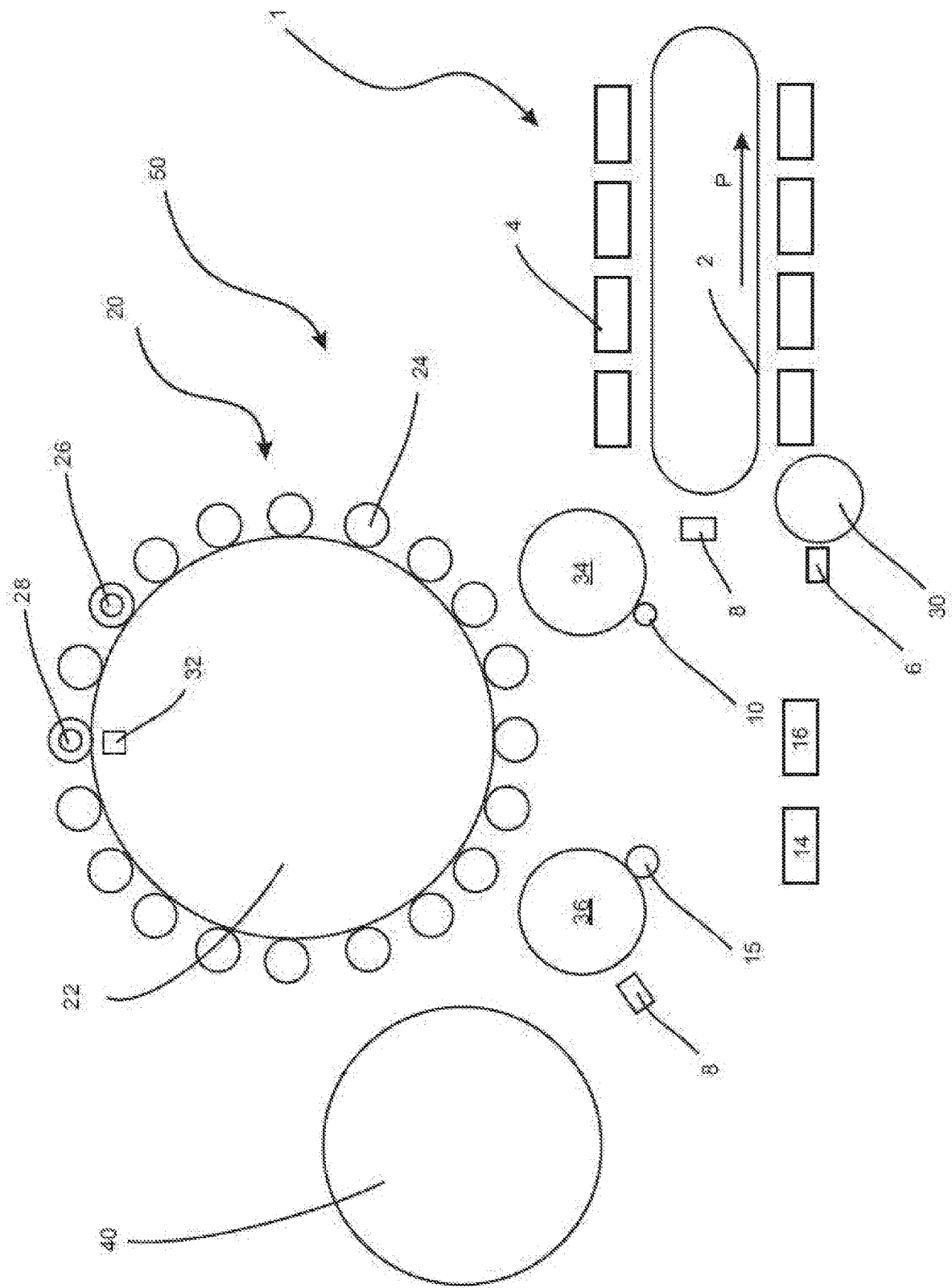

METHOD AND APPARATUS FOR HEATING PLASTIC PREFORMS WITH ABSORPTION MEASUREMENT

BACKGROUND OF THE INVENTION

The present invention relates to a method and apparatus for manufacturing plastic containers. It has long been known in the prior art that plastic preforms are heated and that these heated plastic preforms are subsequently blow-moulded, for example with a stretch blow-moulding machine. It is also known that plastic preforms are directly expanded with a product to be filled. Such stretch blow moulding machines thus process plastic preforms, for example made of PET, into containers. For this purpose, the plastic preforms usually pass through a heating device which heats the plastic preforms to a processing temperature by means of thermal radiation, i.e. in particular by means of infrared radiation. Preferably, this is near-infrared (NIR) radiation in a corresponding spectral range that is particularly suitable for uniform heating of the plastic.

IR radiation is generated by means of emitters (such as IR radiators) that emit a spectrum of electromagnetic waves. This can be, for example, a continuous spectrum similar to a Planckian radiator. However, it would also be possible to use discrete spectral ranges, for example heating by means of an LED, a laser, a magnetron or similar devices.

The absorption of the emitted radiation in the plastic preform is of particular importance for the heating process. Particularly through the use of emitters with a continuous spectrum of radiated energy, this is emitted not only in the infrared wavelength range, but also partly in the visible wavelength range.

It is known from the state of the art that measuring devices are provided which determine the absorption (and/or transmission) in the infrared wavelength range, for example at discrete points in the spectrum. In the following, the term absorption is sometimes used in a simplified manner, but it is pointed out that an absorption and/or a transmission behaviour can be measured in each case.

Furthermore, it is known from the prior art that the containers that are finally produced are checked with regard to their quality, for example with regard to a wall thickness of the respective main bodies of the containers. In the prior art, the absorption behaviour in the infrared spectral range is therefore observed in particular, since the actual heating also takes place with infrared light.

It is known from EP 2 110 224 A1, for example, that the degree of infrared absorption is determined on at least one area of the plastic and that a value characteristic of this IR degree is subsequently used in the production of the containers.

SUMMARY OF THE INVENTION

The present invention is therefore based on the object of better characterising the heat or radiation absorption behaviour of the plastic preforms (and/or the plastic containers subsequently produced therefrom) in comparison with the prior art.

In a method for heating plastic preforms according to the invention, the plastic preforms are transported along a predetermined transport path and heated during this transport by applying electromagnetic radiation. Furthermore, an absorption and/or transmission of the plastic preforms for radiation in an infrared wavelength range is determined.

According to the invention, an absorption and/or transmission of the plastic preforms and/or the plastic containers made therefrom is also determined for radiation in a visible wavelength range.

As mentioned above, in the prior art, an infrared wavelength range or an absorption behaviour of the plastic preform in this wavelength range is usually determined in order to generate the absorption behaviour for the heating radiation from this. However, the applicant has found out that also the absorption in the visible wavelength range is relevant for the heating behaviour of the plastic preforms. This is also based on the fact that the infrared emitters used to heat the plastic preforms also have a comparatively high energy content in the visible wavelength range.

From the internal prior art, it is partly known to detect a colour of the plastic preforms or the plastic containers made from them. This colour is characteristic for the interaction of the container material with the electromagnetic spectrum of visible light. It is also known that the colour of the plastic preforms and/or the colour of the containers made from them is detected by means of suitable measuring devices. In this case, a measurement takes place, in this case partially in a spectral range of visible light.

The applicant has now found that a suitable processing of the measurement signals of the colour also allows different ways of displaying and further processing this information.

In the state of the art, the range of visible light has usually not received any special attention. However, this also contributes to the energy transfer in the plastic preforms.

Evaluation devices partially provided in the prior art for evaluating and observing the colour information served to evaluate geometric or surface defects of the plastic preforms and/or the plastic containers made therefrom.

In the following, the visible wavelength range is understood to be the wavelength range of light that can be seen by the human eye. In particular, this is a wavelength range between approx. 400 nm and 780 nm. The infrared wavelength range is understood to be that wavelength range which has longer wavelengths than 780 nm, in particular the near-infrared wavelength range, which lies, for example, between 780 nm and 3000 nm. However, observation of the far-infrared (FIR) wavelength range would also be conceivable.

With the measuring devices for detecting the absorption and/or transmission (or the absorption and/or transmission behaviour) in the infrared wavelength range as well as the detection in particular of the colour in the visible part of the electromagnetic spectrum, the impression of the heat absorption behaviour of the plastic preforms can be completed.

In a preferred method, limit values for the absorption and/or transmission of the plastic preforms for the electromagnetic radiation are defined. If these are exceeded, it is possible to issue alarms or to eject corresponding plastic preforms before or after heating.

In a preferred method, a colour of the plastic preforms and/or the plastic containers made therefrom is determined and preferably the absorption and/or transmission of the plastic preforms for radiation in the visible wavelength range is determined from the colour of the plastic preforms.

In other words, it is possible that from the colour impression of the plastic preforms, their absorption behaviour and in particular their absorption behaviour in the visible spectrum can be concluded accordingly. However, it would also be possible that the absorption behaviour and/or transmission behaviour or the absorption and/or transmission in the visible wavelength range is measured directly. However, the use of the colour impression has the advantage that corresponding measuring devices are partly a component of such apparatus and therefore no further devices need to be added but only the evaluation of the obtained measurement data is changed or supplemented.

A targeted use of the colour information can be used to achieve evaluations to this effect. This can include, for example, the conversion, detection, representation and further processing of advantageous colour coordinates. Preferably, a Lab colour coordinate system or L*a*b* colour space or CIELAB colour space can be used, which is particularly suitable for the representation of a colour impression for humans and/or for the detection of colour differences.

Particularly preferably, the absorption and/or transmission in the infrared wavelength range and the colour and/or the absorption or transmission in the visible range can be used individually or in combination. In this way, it is possible, for example, that a detection, logging or also a statistical evaluation of the inspected plastic preforms and/or containers takes place.

Preferably, the recorded data of the absorption and/or transmission of the plastic preforms are stored and preferably stored for a plurality of plastic preforms. From this stored data, statistics can be formed, for example regarding the absorption and/or transmission of a specific batch of plastic preforms.

In addition, the recorded data of the absorption and/or transmission can be assigned to the individual inspected plastic preforms. In this way, it is possible to reject certain individual plastic preforms or to treat individual plastic preforms differently, especially in a subsequent blowing process.

In addition, as mentioned above, it is possible to define limit values, in particular discrete limit values, for example, to issue messages, to shut down production or to make other interventions in the processes of the processing plants.

In a further preferred method, at least one absorption and/or transmission is measured and/or determined before heating the plastic preforms. In this case, it would be possible to adapt the heating of the plastic preforms to the measured absorption and/or transmission. In addition, a colour evaluation can also be carried out before heating the plastic preforms. In a further preferred method, an absorption and/or transmission is carried out during and/or after the heating of the plastic preforms. In this way, subsequent processing steps, such as a forming process, can be adjusted in response to these measurements.

In a preferred method, the heated plastic preforms are expanded to form plastic containers and in particular plastic bottles. This is explained in more detail below. Blow moulding machines, in particular stretch blow moulding machines, can be used for this purpose. This expansion can be carried out by blowing pressure, but also by means of liquid, for example with a beverage to be filled.

In a further preferred method, an absorption behaviour and/or transmission behaviour of the plastic containers made from the plastic preforms is determined. Here, too, it is possible to determine the absorption behaviour in the infrared range or in the visible range. This can be done, for example, immediately after the plastic container has been manufactured.

In a further preferred method, a measurement and/or evaluation is carried out continuously, wherein particularly preferred interventions are carried out with which process parameters of a (in particular subsequent) processing plant are adapted. The aim of this adaptation can be to ensure a constant output quality even if the quality of the plastic preforms changes.

It is particularly preferred that the plastic preforms are plastic preforms that consist of at least a predetermined proportion of recycled plastic material. Such plastic preforms often have a lower homogeneity of their material.

This can be the case, for example, if recycled plastic is used or if there is alternating processing of different as new plastic materials. The relevant measures are explained in more detail below.

In a preferred method, at least one absorption and/or transmission is measured depending on the location. Thus, it is possible that a region of the plastic preform and/or the surface of the plastic preform (or of the container made from it) is examined with regard to its absorption and/or transmission. For example, the absorption and/or transmission can be specified as a function of a position in the longitudinal direction or over the circumference of the plastic preform as well as in both directions.

In a further preferred method, plastic preforms are rejected in response to the measurements made here. In particular, plastic preforms or containers can be rejected on the basis of these measurement results. Furthermore, it would also be possible for plastic preforms or containers to be sorted on the basis of the measurement results.

With the present invention, improved quality assurance in the plants can be achieved. In addition, more stable production processes can be achieved and cost and energy savings in production are possible through a more targeted or reduced use of resources. In addition, reject rates can preferably also be reduced and simple operation of processes in the processing plants is made possible.

In a further preferred method, at least one characteristic feature of the manufactured containers is determined, wherein this feature particularly preferably being a wall thickness of the manufactured container or the occurrence of variations in the wall thickness. This wall thickness can also be determined, for example, with absorption and/or transmission measurements.

In a further preferred method, at least one value is determined from the absorption behaviour and/or transmission behaviour for electromagnetic radiation, which is characteristic for a heat absorption behaviour of the plastic preforms. It is possible that this behaviour is determined from an infrared absorption behaviour and/or an absorption behaviour (or absorption and/or transmission) for visible light. Particularly preferably, the absorption behaviour is determined in predetermined areas of the plastic preforms.

Particularly preferably, the behaviour is determined as a function of a height of the plastic preforms. It is pointed out in this context that it would also be possible to determine a reflection behaviour of the plastic preforms and/or the plastic containers made from them in order to derive their properties.

In a further preferred method, an emitter which emits the electromagnetic radiation in a predetermined wavelength spectrum is used to determine the absorption and/or transmission behaviour (or the absorption and/or transmission).

For example, the infrared radiation can be generated by means of emitters which emit a spectrum of electromagnetic waves. It is particularly preferred that this is a continuous spectrum, preferably, for example, in the form of a Planckian radiator. However, it would also be possible for discrete spectral ranges to be emitted, for example by means of LEDs or lasers or similar devices.

In a preferred method, the absorption of the emitted light or radiation in the plastic preform is decisive for the heating process. In particular, by using emitters with a continuous spectrum of radiated energy, this is not only emitted in the infrared part of the wavelength spectrum, but also partly in the visible wavelength range.

In a preferred method, it is possible that an absorption and/or transmission in the visible wavelength range is used to determine a colour of the plastic preforms. In this method, the absorption and/or transmission in the visible wavelength range is measured and the colour impression of the plastic preforms is determined or calculated from this absorption.

In a further preferred method, a statistical evaluation of the plastic preforms and/or plastic containers is carried out. It is possible to detect a plurality of measurement results for a plurality of plastic preforms and/or plastic containers, on the basis of which statistical values about an absorption behaviour can be derived and/or determined.

The present invention is further directed to an apparatus for heating plastic preforms, comprising a transport device which transports the plastic containers along a predetermined transport path and at least one heating device, which heats the plastic preforms by applying electromagnetic radiation (and in particular infrared radiation), and having a detection device which detects an absorption and/or transmission of the plastic preforms for electromagnetic radiation in an infrared wavelength range (and/or with an intensity maximum in the infrared wavelength range).

According to the invention, the apparatus has a and preferably a further detection device which at least indirectly detects an absorption and/or transmission for electromagnetic radiation (or a value characteristic of this absorption and/or transmission or a value from which a value for the absorption and/or transmission can be derived) in a visible wavelength range of the plastic preforms and/or of the plastic containers subsequently produced from these plastic preforms.

Indirect detection is understood to mean that the absorption and/or transmission is derived from other data, for example from a colour behaviour of the plastic preforms or plastic containers. Direct detection is understood to mean in particular the detection of an absorption and/or transmission spectrum.

This further detection device can also be a combination of an emitter and a detector, but it would also be possible that the absorption and/or transmission of the plastic preforms is obtained from a colour impression of the plastic preforms or the plastic containers. This colour impression can be achieved by taking pictures of the plastic preforms or plastic containers with a colour camera.

Particularly preferably, the transport device is suitable and intended for transporting the plastic preforms individually. For example, individual holding devices such as holding mandrels can be provided, which hold individual plastic preforms and transport them, for example, through heating alleys.

In a further preferred embodiment, the heating device is stationary. It is thus possible for the plastic preforms to be transported past heating devices such as heating boxes. These heating devices can each have a plurality of radiant heaters which are arranged one above the other in the longitudinal direction of the plastic preforms to be heated and/or extend in the transport direction of the plastic preforms.

In a particularly preferred embodiment, the first and/or the second detection device is also arranged stationary and the plastic preforms are transported past it.

Furthermore, it is also possible that at least one detection device is provided which determines a wall thickness of the plastic preforms.

In a further preferred method or in a further preferred apparatus, the absorption and/or transmission can be measured spatially resolved with respect to the plastic preform or the plastic container.

In a further advantageous embodiment, at least one detection device is arranged upstream or downstream of the heating device in the transport direction of the plastic preforms. It would also be possible for one detection device to be arranged upstream and one detection device to be arranged downstream of the heating device. In a further preferred embodiment, at least one detection device is arranged in a region of a feed device which feeds the plastic preforms to the heating device or in a region of a discharge device which discharges the heated plastic preforms. Furthermore, it would also be possible for both detection devices to be arranged in this area.

In a further advantageous embodiment, the apparatus has an evaluation device which, using measurement results of the first detection device and/or the second detection device, determines at least one value which is characteristic of an absorption behaviour and/or a transmission behaviour of the plastic preforms and/or of the plastic containers produced from these plastic preforms.

In a further preferred embodiment, at least one detection device has an emitter device which emits electromagnetic radiation and a detector device which detects radiation emitted by the emitter device and transmitted by plastic preforms and/or plastic containers. In this way, a wavelength spectrum can be recorded from which the absorption behaviour of the plastic preforms or plastic containers can be determined.

In a preferred embodiment, at least one detection device, and in particular the detection device for determining the absorption behaviour in the visible wavelength range, has an image recording device which records a spatially resolved image of the plastic preforms and/or the plastic containers made from them. Furthermore, in this case, an evaluation device is preferably provided which derives information from this image which is characteristic of the absorption and/or transmission of the plastic preform.

The present invention is further directed to a plant for producing plastic containers, comprising an apparatus of the type described above, as well as a forming device arranged downstream of said apparatus in a transport direction of the plastic preforms for forming plastic preforms into plastic containers.

Particularly preferably, this forming device is a blow-moulding machine and in particular a stretch blow-moulding machine. Particularly preferably, this forming device has a plurality of forming stations which are preferably arranged on a common movable and in particular rotatable carrier. Preferably, these forming stations are blowing stations. Preferably, these forming stations each have rod-like bodies and in particular stretching rods which stretch the plastic preforms in their longitudinal direction. In addition, the forming stations preferably also have application devices which act upon the plastic preforms with a flowable and, in particular, gaseous medium.

In a preferred embodiment, the forming device has a control device which controls the forming processes, in particular separately for each forming station.

Particularly preferably, the control device is suitable and intended for controlling and/or regulating the forming processes depending on measurement results of the detection devices. For example, blowing pressures as well as the time sequence with which the plastic preforms are applied with them can be adjusted. Also, for example, a movement of the abovementioned stretching rod can be adapted to the values measured by the detection devices. Particularly preferably, the control device allows individual control of the forming process for each individual plastic preform.

BRIEF DESCRIPTION OF THE DRAWINGS

Further advantages and embodiments can be seen in the attached drawing:
In the drawing:
FIG. 1 shows a schematic representation of a plant for the production of plastic containers according to the invention.

DETAILED DESCRIPTION OF THE INVENTION

FIG. 1 shows a plant 50 for producing plastic containers 15. This plant here has an apparatus 1 for heating plastic preforms 10 and a forming device 20 arranged downstream of this apparatus 1 for forming these plastic preforms 10 into plastic containers 15.

In the embodiment shown in FIG. 1, the forming device 20 has a rotatable carrier 22 on which a plurality of forming stations 24 are arranged for forming the plastic preforms into the plastic containers 15. The individual forming stations 24 preferably each comprise blow moulds 26 within which the plastic preforms are formed. In addition, the forming stations 24 each have stretching rods 28 which can be inserted into the plastic preforms 10 in order to stretch them in their longitudinal direction.

In addition, the individual forming stations 24 each have valve units 32 with a plurality of valves which control the supply of the blowing air with which the plastic preforms are expanded.

The reference sign 34 indicates a feed starwheel which feeds the plastic preforms to the forming device 20 and the reference sign 36 indicates a discharge starwheel which discharges the manufactured plastic containers 15 from the forming device 20.

The reference sign 40 indicates a further treatment device for treating the plastic containers, such as in particular but not exclusively a filling device which fills the plastic containers with a liquid and in particular a beverage.

The reference sign 1 indicates the apparatus for heating the plastic preforms. This apparatus 1 has a transport device 2 which transports the plastic preforms individually and in particular past stationary heating devices 4 (transport path P).

The reference sign 30 indicates a feed device which feeds the plastic preforms 10 to the apparatus 1, and the reference sign 34 indicates a feed starwheel which removes the heated plastic preforms 10 from the apparatus 1 and feeds them to the forming device.

The reference sign 6 roughly schematically indicates a first detection device which is suitable and intended for determining an absorption and/or transmission of the plastic preforms to be heated, wherein here the determination takes place in particular in a near-infrared wavelength range. This detection device is arranged here on the feed device. However, it would also be possible to provide this detection device at another location, for example in a deflection area of the apparatus 1 in which the transport direction of the plastic preforms is reversed or in an area of the feed starwheel 34.

Preferably, this detection device 6 comprises at least one emitter and at least one detector, wherein the plastic preforms are transported between this emitter and this detector and in this way the absorption and/or transmission is determined.

The reference sign 8 identifies a second detection device which at least indirectly enables detection of absorption and/or transmission of the plastic preforms or the plastic containers made from them (in particular in a visible wavelength range). This further detection device can be positioned at different areas of the system 50, as shown in FIG. 1.

This detection device can also have at least one emitter and at least one detector. However, it would also be possible for this detection device to be used to detect other properties such as a colour of the plastic preforms or plastic containers and to use these properties to determine an absorption and/or transmission of the plastic preforms in the visible wavelength range.

Depending on the values of absorption and/or transmission detected by the detection device 6 and/or by the detection device 8, the heating of the plastic preforms can be controlled. In particular, however, the forming of the plastic preforms into the plastic containers is also controlled using these values. For example, the individual valve devices of the valve units 32 can be controlled accordingly.

Furthermore, an allocation device 16 is preferably provided which allocates to each plastic preform detected and/or inspected by the detection device 6 a specific forming station in which this plastic preform is later blown into a plastic container. This assignment makes it possible to individually adapt the parameters with which this plastic preform is formed to this plastic preform.

The applicant reserves the right to claim all features disclosed in the application documents as essential to the invention, provided they are individually or in combination new compared to the prior art. Furthermore, it is pointed out that the individual FIGURES also describe features which may be advantageous in themselves. The skilled person immediately recognises that a certain feature described in a FIGURE can also be advantageous without adopting further features from this FIGURE. Furthermore, the skilled person recognises that advantages can also result from a combination of several features shown in individual FIGURES or in different FIGURES.

The invention claimed is:

1. A method for heating plastic preforms, wherein the plastic preforms are transported along a predetermined transport path and are heated during this transport by applying electromagnetic radiation, wherein an absorption and/or transmission of the plastic preforms is determined, at one location along the transport path, for radiation in an infrared wavelength range,
    wherein
    an absorption and/or transmission of the plastic preforms and/or of the plastic containers produced from these plastic preforms is also determined, at another location along the transport path, for radiation in a visible wavelength range, and wherein
    at least one absorption and/or transmission is measured depending on the location, wherein a region of the plastic preform and/or the surface of the plastic preform is examined with regard to its absorption and/or transmission.

2. The method according to claim 1,
    wherein a colour of the plastic preforms and/or of the plastic containers produced from these plastic preforms is determined.

3. The method according to claim 1, wherein
at least one absorption and/or transmission of the plastic preforms is measured before heating the plastic preforms.

4. The method according to claim 1, wherein
the heated plastic preforms are expanded to form plastic containers.

5. The method according to claim 1, wherein
an absorption behaviour of the plastic containers produced from the plastic preforms is determined.

6. The method according to claim 1, wherein
at least one characteristic feature for the manufactured plastic containers is determined and this feature is selected from a group of features consisting of a wall thickness of the plastic container, a wall thickness distribution, a colour, and the occurrence of material defects.

7. The method according to claim 1, wherein
at least one value characteristic of a heat absorption behaviour of the plastic preforms is determined from the absorption or transmission for electromagnetic radiation.

8. The method according to claim 1, wherein
for determining the absorption and/or transmission, emitters are used which emit electromagnetic radiation in a predetermined wavelength spectrum.

9. The method according to claim 1, wherein
the absorption and/or transmission in the visible wavelength range is further used to determine a colour of the plastic preforms.

10. The method according to claim 1, wherein
a statistical evaluation of the plastic preforms and/or of the plastic containers produced from these plastic preforms is carried out.

11. An apparatus for heating plastic preforms, having a transport device configured to transport the plastic containers along a predetermined transport path, and having at least one heating device configured to heat the plastic preforms by applying electromagnetic radiation, and having first a detection device positioned at one location along the transport path, configured to detect an absorption and/or transmission of the plastic preforms for electromagnetic radiation in an infrared wavelength range,
wherein
the apparatus also has a second detection device positioned at another location along the transport path, configured to at least indirectly detect an absorption and/or transmission of the plastic preforms and/or of the plastic containers which are subsequently produced from these plastic preforms, for electromagnetic radiation in a visible wavelength range, and
wherein at least one absorption and/or transmission is measured depending on the location, wherein a region of the plastic preform and/or the surface of the plastic preform is examined with regard to its absorption and/or transmission.

12. The apparatus according to claim 11, wherein
at least one detection device is arranged in the transport direction of the plastic preforms before or after the heating device.

13. The apparatus according to claim 11, wherein
the apparatus has an evaluation device configured to use measurement results of the first evaluation device and the second evaluation device to determine at least one value which is determined for an absorption behaviour and/or a transmission behaviour of the plastic preforms and/or of the plastic containers produced from these plastic preforms.

14. The apparatus according to claim 11, wherein
at least one detection device comprises an emitter device configured to emit electromagnetic radiation and a detector device configured to detect radiation emitted by the emitter device and transmitted from the plastic preforms and/or plastic containers.

15. A plant for producing plastic containers, having an apparatus as claimed in claim 11 and a forming device, arranged downstream of this apparatus in a transport direction of the plastic preforms, for forming plastic preforms into plastic containers.

* * * * *